US006961783B1

(12) United States Patent
Cook et al.

(10) Patent No.: US 6,961,783 B1
(45) Date of Patent: Nov. 1, 2005

(54) DNS SERVER ACCESS CONTROL SYSTEM AND METHOD

(75) Inventors: Jeffrey Cook, Santa Monica, CA (US); Handong Wu, Los Angeles, CA (US); Lindy Foster, Dunsmuir, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 805 days.

(21) Appl. No.: 10/027,307

(22) Filed: Dec. 21, 2001

(51) Int. Cl.[7] ............................................. G06F 15/16
(52) U.S. Cl. ...................... 709/245; 709/223; 709/227
(58) Field of Search ............................... 709/227, 203, 709/245, 223; 713/201, 153

(56) References Cited

U.S. PATENT DOCUMENTS

| 5,673,322 A | 9/1997 | Pepe et al. .................... 380/49 |
| 5,793,763 A | 8/1998 | Mayes et al. ................. 370/389 |
| 5,805,803 A | 9/1998 | Birrell et al. ............. 395/187.01 |
| 5,822,434 A | 10/1998 | Caronni et al. ................ 380/49 |
| 5,835,718 A | 11/1998 | Blewett ................... 395/200.48 |
| 5,864,683 A * | 1/1999 | Boebert et al. .............. 709/249 |
| 5,884,272 A | 3/1999 | Walker et al. .................. 705/1 |
| 5,907,677 A | 5/1999 | Glenn et al. ............. 395/200.36 |
| 5,918,018 A | 6/1999 | Gooderum et al. ..... 395/200.55 |
| 5,961,593 A | 10/1999 | Gabber et al. ............... 709/219 |
| 6,003,084 A * | 12/1999 | Green et al. ................. 709/227 |
| 6,052,725 A | 4/2000 | McCann et al. ............. 709/223 |
| 6,052,788 A | 4/2000 | Wesinger, Jr. et al. ....... 713/201 |
| 6,154,839 A | 11/2000 | Arrow et al. ................ 713/154 |
| 6,182,226 B1 | 1/2001 | Reid et al. ................... 713/201 |

OTHER PUBLICATIONS

RFC 2663 "IP Network Address Translator (NAT) Terminology and Considerations" Lucent Technologies, Aug. 1999.

* cited by examiner

Primary Examiner—Kamini Shah
(74) Attorney, Agent, or Firm—Zilka-Kotab, PC; Christopher J. Hamaty (57) ABSTRACT

A method for controlling access to information from a DNS server having an access control list specifying clients approved to receive an IP address corresponding to a domain name of a target host is disclosed. The method includes receiving a request from a client for an IP address of a domain name at the DNS server and looking up the domain name in an access control list. The client is sent a reply containing the IP address of the domain name if the client is authorized in the access control list to receive the IP address. If the client is not authorized to receive the IP address, the request is denied.

34 Claims, 5 Drawing Sheets

| DNS Request | ACL status | Default | Preferred Options |
|---|---|---|---|
| → | Allowed | → | ⇢ |
| → | Denied | None | None |
| ⇢ | Allowed | ⇢ | ⇢ |
| ⇢ | Denied | None | None |
| ↟ | Allowed | ↟ | ↟ |
| ↟ | Denied | None | None |
| ⇡ | Allowed | ⇡ | ⇡ |
| ⇡ | Denied | None | None |

→  PLAIN TEXT
⇢  SIGNED
↟  SIGNED AND ENCRYPTED
⇡  ENCRYPTED AND SIGNED

DNS SERVER ACCESS CONTROL SYSTEM AND METHOD

BACKGROUND OF THE INVENTION

The present invention relates generally to Internet Protocol (IP) addressing, and more particularly, to a system and method for controlling access to DNS (Domain Name Service) servers.

IP addresses for hosts on the Internet are publicly available by looking up a host URL (Uniform Resource Locator) name via a domain name system. The domain name system is a global network of servers that translate host names like www.nai.com into numerical IP addresses (e.g., 208.228.229.218) which computers on the Internet use to communicate with each other. The Internet makes use of a network of DNS servers to form a distributed database of mappings between domain names and IP addresses and resolve URLs. When a client computer wants to resolve a URL, it queries its DNS server. The client uses a DNS resolver to locate its DNS server. If the DNS server is not authoritative for the destination domain, or if the DNS server does not have the information in its cache, it will not be able to answer the client query immediately. Instead, the DNS server acts as a DNS forwarder or issues a recursive query. A client may also receive a non-authoritative response from a DNS server if the server has found the answer in its cache. A DNS forwarder will forward the query to a second DNS server higher up in the tree of servers. If recursive querying is allowed, the DNS server asks a root name server or the IP address of a host that is authoritative for the destination domain, and then contacts the authoritative server and reports back to the client.

The public availability of IP addresses for specific hosts makes them easy targets for various types of attacks, such as Denial of Service (DoS) attacks. In the connected world of the Internet, destructive individuals can create major network security problems for administrators with systems exposed to public networks. The recent Denial of Service attacks on many of the web's most popular sites makes this clearer than ever before. A Denial of Service attack occurs when a malicious attacker sends continuous TCP/IP packets to a server, which quickly take up resources until there are no more resources available and a system hang or crash occurs. Commonly the targeted site may appear unavailable to the broader Internet because of the saturation of its network segment. Denial of Service attacks can result in significant loss of time and money for many organizations.

Denial of Service attacks are different from most other attacks because they are not targeted at gaining access to a network or information on the network. These attacks focus on making a service unavailable for normal use, which may be accomplished by exhausting some resource limitation on the network or within an operating system or application. Denial of Service attacks are most frequently executed against network connectivity. The goal is to prevent hosts or networks from communicating on the network. There are several types of Denial of Service attacks, which can occur at various levels. When involving specific network server applications, such as a Hypertext Transfer Protocol (HTTP) server or a File Transfer Protocol (FTP) server, these attacks can focus on acquiring and keeping open all of the available connections supported by that server, effectively locking out valid users of the server or service. Denial of Service attacks can also be implemented using other Internet protocols, such as UDP and Internet Control Message Protocol (ICMP).

The most common Denial of Service attack is the SYN attack. This is a network level attack. The attacker sends continuous TCP SYN packets to a server. Each TCP SYN packet clogs the connection until there are no more TCP resources available. The attacker begins the process of establishing a connection to the victim machine, but does it in such a way as to prevent the ultimate completion of the connection. In the meantime, the victim machine has reserved one of a limited number of data structures required to complete the impending connection. The result is that legitimate connections are denied while the victim machine is waiting to complete phony "half-open" connections. This type of attack does not depend on the attacker being able to consume network bandwidth. The intruder may be consuming kernel data structures involved in establishing a network connection. The implication is that an intruder can execute this attack from a dial-up connection against a machine on a very fast network.

Conventional security systems or firewalls attempt to protect a client's identity when requesting information on the network. Systems such as Network Address Translator (NAT) are used to hide internal IP addresses by mapping a global IP address to one or several local IP addresses. Firewalls prevent tampering with private resources by unauthorized users. A network administrator typically establishes a set of rules that specify what types of packets (e.g., from a particular IP address or port) are allowed to pass and what types are blocked. This packet filtering may be effective in dealing with the most common types of network security threats; however, it is often easy to exploit by an experienced hacker. Firewalls may also use proxies. A proxy is a program, running on an intermediate system that deals with servers on behalf of clients. Clients which are attempting to communicate with a network that is protected by a firewall, send requests for connections to proxy based intermediate systems. The proxy relays approved client requests to target servers and relays answers back to clients. These systems generally protect the client's identity rather than providing a security mechanism for servers or hosts. Furthermore, conventional security systems generally do not protect the identity of a public IP address or support mapping between global IP addresses.

Figure 1:
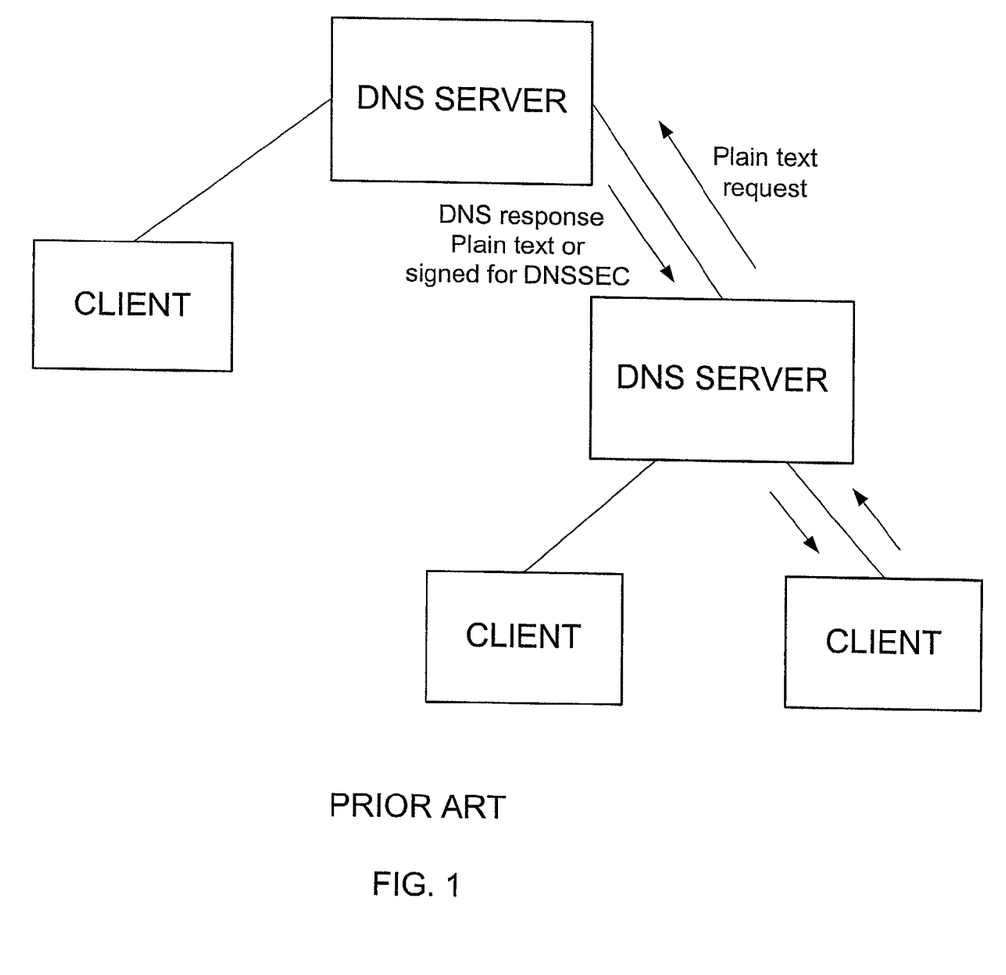
FIG. 1 is a diagram illustrating operation of a prior art DNS server.

Conventional DNS servers provide IP addresses for any host that they have information on or can find information on without any restriction. As shown in FIG. 1, a conventional DNS server receives a plain text request and responds with a plain text response. Since there is no authentication, and clients accept the first DNS reply to be received, DNS is also vulnerable to spoofing. Spoofing occurs when attackers interject themselves into the network in such a manner as to reply faster than a valid DNS server. The attacker thus replies with false information before the real reply arrives. With conventional DNS servers, an IP address cannot be hidden from the general public in order to defeat or prevent DoS and other types of attacks, while still being made available to specific clients. A new security system called DNSSEC (DNS Security) allows DNS servers to verify their domain names and corresponding IP addresses using digital signatures and public-key encryption. A digital signature proves that the message originated from a certain source and that the message has not been changed. The digital signature binds the identity of the originator to the identity of the key used to sign the message. DNSSEC allows DNS servers to authenticate replies and permits clients to authenticate those replies. To prove authenticity of data, an authoritative source creates and digitally signs the data. DNSSEC uses asymmetric cryptography (public key encryption) in which each DNSSEC server has a private key and a widely distributed public key. The DNSSEC server creates a digital signature with its private key, and the client verifies the signature with the public key corresponding to the private key. This allows a DNS client to verify that an answer it receives in response to its query came from an authorized source. DNSSEC, however, only provides authentication of a DNS reply to clients. DNSSEC does not allow an IP address to be hidden in a reply and cannot be used to defeat or prevent DoS and other types of attacks.

There is, therefore, a need for a method and system for controlling responses to requests made of a DNS server so that at least some of its mappings from domain names to IP addresses are accessible only to specified clients or clients that can authenticate themselves to the DNS server.

SUMMARY OF THE INVENTION

A method and system for controlling access to information from a DNS server having an access control list specifying clients approved to receive an IP address corresponding to a domain name of a target host are disclosed.

The method generally comprises receiving a request from a client for an IP address of a domain name at the DNS server and looking up the domain name in an access control list. The client is sent a reply containing the IP address of the domain name if the client is authorized in the access control list to receive the IP address. If the client is not authorized to receive the IP address, the request is denied.

The request and reply may be sent in plain text, signed, encrypted, signed and encrypted, or encrypted and signed.

A computer program product for controlling access to the DNS server generally comprises computer code that receives a request from a client for an IP address of a domain name at the DNS server and looks up the client in an access control list. The product further includes computer code that sends to the client a reply containing the IP address of the domain name if the client is authorized in the access control list to receive the IP address, and denies the request if the client is not authorized to receive the IP address. A computer-readable storage medium is provided for storing the codes.

A system for controlling access to the DNS server generally comprises an access control list specifying clients approved to receive an IP address of a domain name and a processor. The processor is configured to receive a request from a client for an IP address of a domain name, look up the domain name in the access control list, and send the client a reply containing the IP address of the domain name if the client is authorized in the access control list to receive the IP address, and deny the request if the client is not authorized to receive the IP address. The system further includes memory for storing the access control list and IP addresses.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 2:
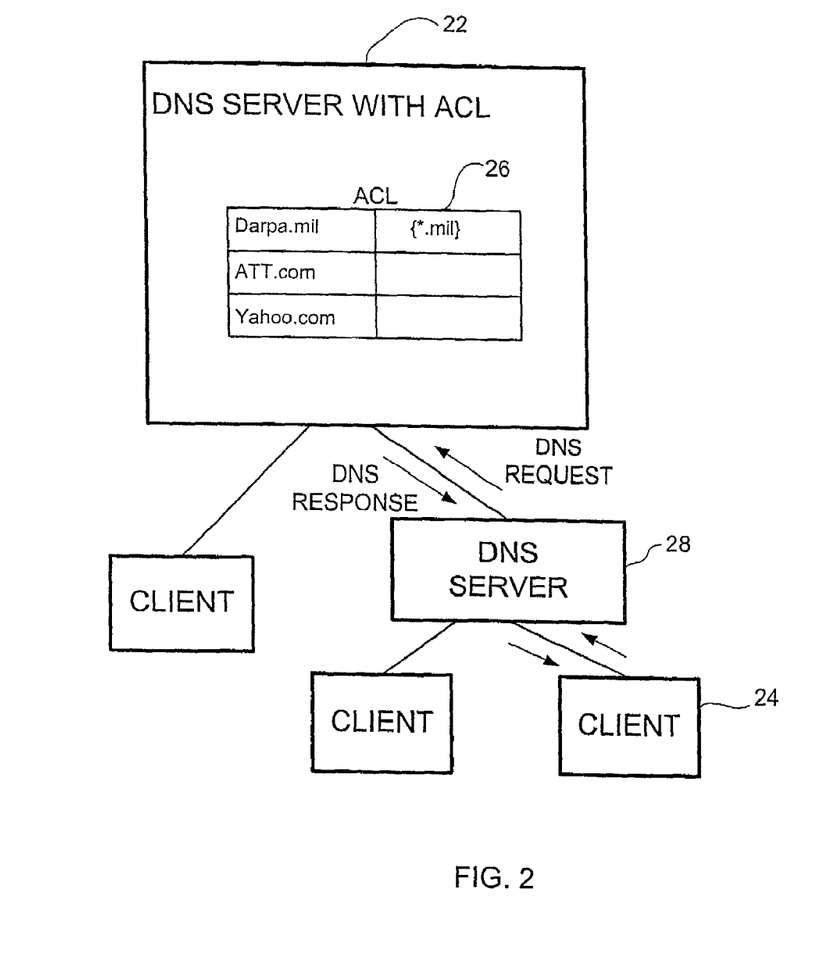
FIG. 2 is a diagram of a system of the present invention for controlling access to a DNS server.

Referring now to the drawings, and first to FIG. 2, a system for controlling access to a DNS server 22 is shown. The DNS server 22 serves DNS requests, sends DNS replies, and makes DNS requests of higher-level servers. The system controls access to a DNS server 22 so that at least some of its stored IP addresses are accessible only to clients 24 that are approved to receive the IP address or that can authenticate themselves to the DNS server. The client 24 makes a DNS request for mappings from domain names to IP addresses and receives DNS replies. The request is a query to the DNS server 22 to resolve a domain name to an IP address. The reply is a response from the DNS server 22 that specifies the IP address (i.e., result object in the DNS reply) associated with a domain name (i.e., query object in the DNS request).

The present invention operates in the context of a data communication network including multiple network elements. The network may be, for example, the Internet. It is to be understood, however, that the system and method of the present invention may also be used in networks which are not connected to the Internet and may be used, for example, in intranets or any other type of network.

The DNS server is used to translate host names such as www.company.com into numerical IP addresses, which computers on the Internet use to communicate with each other. The domain name system is a distributed Internet directory service used to translate between domain names and IP addresses. The DNS server responds to browser requests by supplying name-to-address conversions. Generally, at the top of the DNS database tree are root name servers, which contain pointers to master name servers for each of the top-level domains. For example, to find out the numeric address of www.company.com, the DNS server would ask the root name server for the address of the master name server for the .com domain. The master name servers for each of the top-level domains contain a record and name-server address of each domain name. In order to find out the numeric address of www.company.com, the DNS server asks the .com server for the name of the server that handles the company.com domain.

The individual name servers for each domain name, such as company.com, contain detailed address information for the hosts in that domain. The DNS server then asks the company.com server for the name of the server that handles the company.com domain. Finally, this most specific name server supplies the DNS server with the IP address of the URL. In a conventional DNS transaction, a client seeks an IP address from a given host from any server that the client knows about. These servers recursively forward the request to higher-level servers until a reply is received, which is forwarded back to the original client.

The DNS server of the present invention allows only clients that are approved by the DNS server to receive responses. As shown in FIG. 2, the DNS server 22 includes an access control list (ACL) 26. The ACL table lists a plurality of URLs and specifies for at least some of the URLs which clients can have access to the IP address of the URL. For example, the ACL table 26 of FIG. 2 includes Darpa.mil, ATT.com, and Yahoo.com. There is no corresponding list of authorized users for ATT.com or Yahoo.com, thus, the corresponding IP addresses are accessible to anyone that requests them. The IP address for Darpa.mil, however, is accessible only to mil users. The DNS server 22 may require that the user submit the request with a digital signature so that the DNS server can verify that the requester is actually a mil user. The originating client 24 may also send an encrypted request to the DNS server 22. It is to be understood that the ACL table 26 may have different configurations than described above, without departing from the scope of the invention. For example, if no clients are listed, all clients may be denied access (rather than all being allowed access). Also, listed clients may either be all allowed access or all denied access.

The ACL table 26 may also include a list of preferred response formats for sending the IP address of each target host. For example, the IP address for Darpa.mil may only be sent in an encrypted format. The encrypted reply is forwarded back to the original client requesting connection to the Darpa.mil web site. When the originating client 24 receives the encrypted response, the client decrypts it with a key distributed by the target host (e.g., Darpa.mil site). Only the clients that the target DNS server has approved in its access control list have access to the decryption keys. The encrypted reply is unreadable to the intermediate DNS servers 28 that it passes along the way. After decrypting the reply, the client 24 has the real IP address of the target host and can use the IP address for communication directly with the target host. The reply may be cached at intermediate servers.

In addition to encrypting the message, the DNS sever 22 may also sign the message. The DNS server 22 may use symmetric cryptography (secret-key) or asymmetric cryptography (public-key). In a symmetric cryptographic system, the DNS server and client approved in the ACL table share the same secret cryptographic key that can be used to authenticate messages sent between them. In an asymmetric cryptographic system, the DNS server uses its own private key to sign the message, and a public key is used to verify the signature. The DNS server 22 may also send the message with the IP address in plain text, or signed and not encrypted, as described below with respect to the table of FIG. 3.

Figure 3:
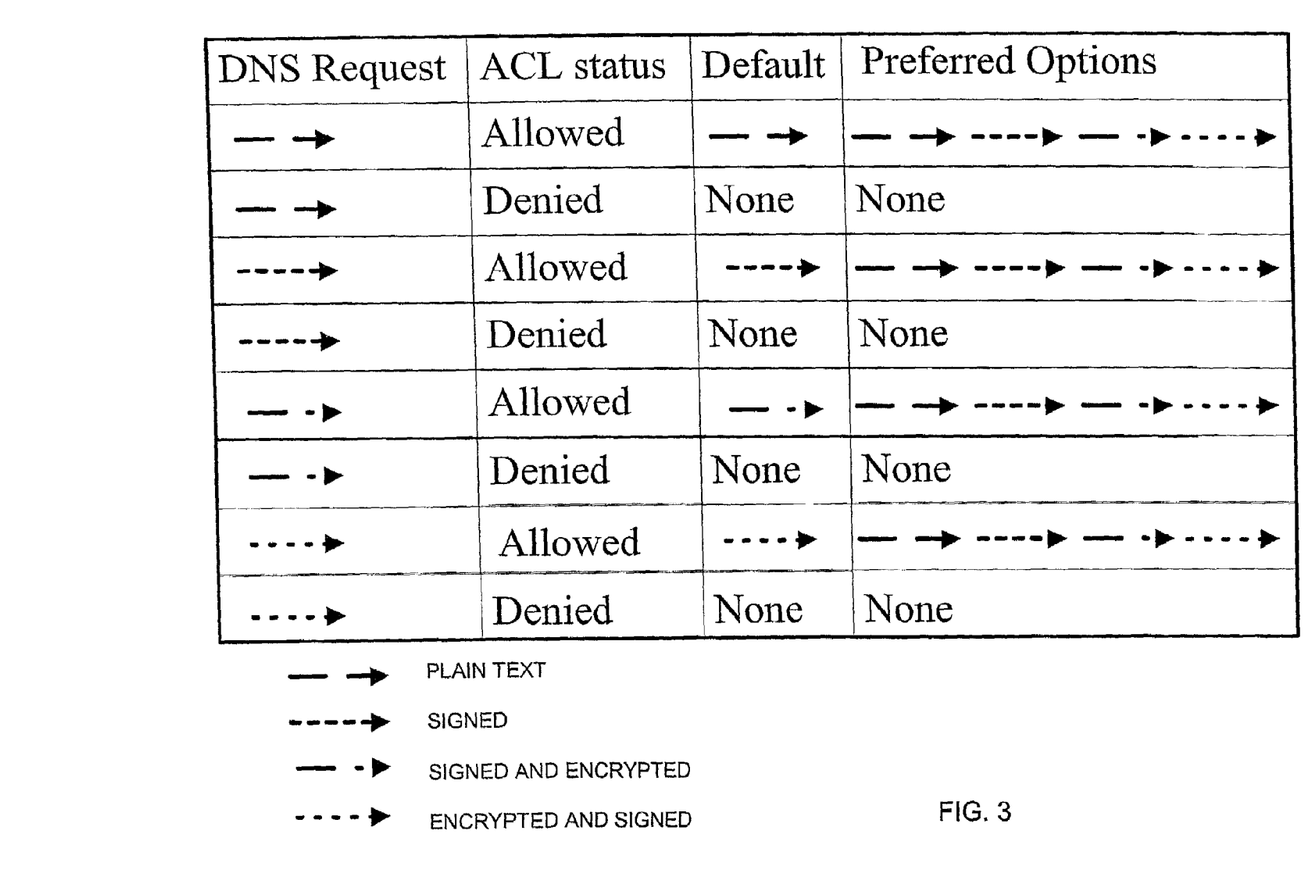
FIG. 3 is a table listing default and preferred responses from a DNS server of the present invention.

FIG. 3 is a table illustrating responses provided by the DNS server 22 based on the type of request received and the ACL status of the client 24. As discussed above, the reply and responses may be sent in the following formats: plain, signed, encrypted, signed and encrypted, or encrypted and signed. (The last two differing in the order that the signing and encryption is performed). The reply and response may be the same format or have different formats. For example, if a plain text request is received, and there is no preference specified as to how the response is to be sent, a plain text response will be sent if the client 24 is authorized in the ACL table 26. Similarly, if a signed request is received, the default response will be signed, and if a signed and encrypted request is received, the default response will be signed and encrypted. The ACL table 26 may include a preferred response, as shown under the preferred options of the table of FIG. 3. Preferably, the response will have at least the same security level as that of the request. For example, if a signed and encrypted request is received, the response is preferably not a plain text response. The security level of the DNS server may also be modified, for example, if an attack is identified. For example, the DNS server may deny all requests that are not signed, even if the client requesting the information is approved in the ACL table 26. Another option is to vary the security level for different IP addresses. For example, specific clients may be required to send a signed request, while other clients may send a plain text request. It is to be understood that many different combinations of security levels for different hosts or clients may be specified within one DNS server. This information may be contained within the ACL table or another table with links to the ACL table or a master list of hosts.

Figure 4:
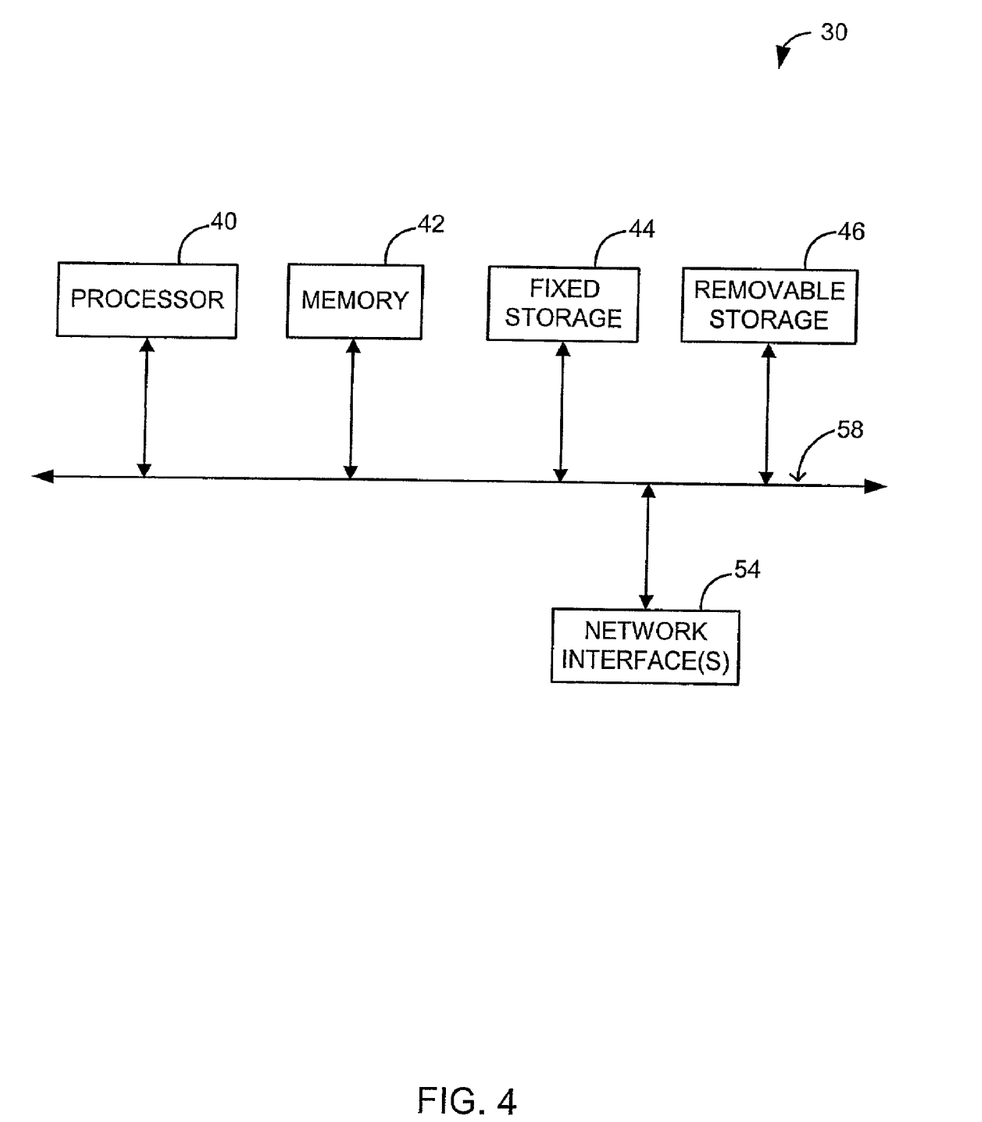
FIG. 4 is a diagram illustrating a logical architecture of a computer system that may be used to execute software of this invention.

FIG. 4 shows a system block diagram of a computer system, generally indicated at 30, that may be used within the network to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable storage may also include tape, flash memory, or system memory. Additionally, a data signal embodied in a carrier wave (e.g., in a network including the Internet) may be the computer readable storage medium. The computer system 30 may further include a display screen, keyboard, and mouse which may include one or more buttons for interacting with a GUI (Graphical User Interface). Other computer systems suitable for use with the invention may include additional or fewer subsystems. For example, the computer system 30 may include more than one processor 40 (i.e., a multi-processor system) or a cache memory.

The system bus architecture of the computer system 30 is represented by arrows 58 in FIG. 4. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system 30 shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces 54, for example. The inside interface may be connected to a private network, while the outside interface may be connected to an external network such as the Internet. Preferably, each of these interfaces includes a plurality of ports appropriate for communication with the appropriate media, and associated logic, and in some instances memory.

Figure 5:
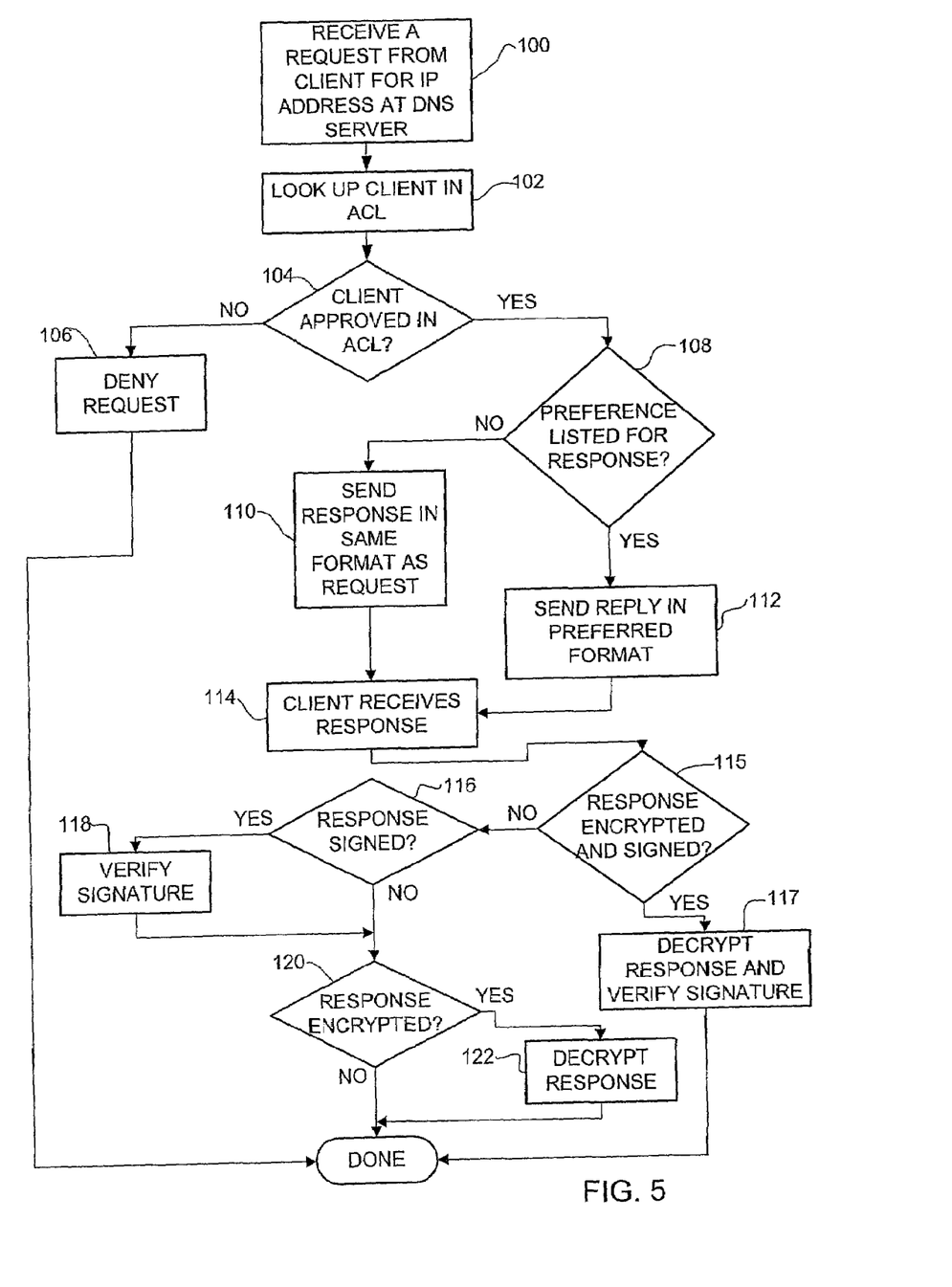
FIG. 5 is a flowchart illustrating a process for controlling access to a DNS server.

FIG. 5 is a flowchart illustrating a process of the present invention for controlling access to a DNS server. A user wanting to access a host web site types in a URL at his computer or Internet device and a browser loaded in the computer sends a request to the closest DNS server. The DNS server may use a resolver and ask a server farther up the DNS tree to find the IP address, if required. At step 100, the DNS server 22 receives the request for the IP address from the originating client 24. If the request is signed, the DNS server 22 will verify the signature to authenticate the originating client 24. The DNS server 22 looks up the target host in its ACL table 26 to see if the originating client 24 is authorized to receive the IP address of the target host (step 102). If the client 24 is not approved to receive the requested IP address, the request is denied (steps 104 and 106). If the client 24 is approved, the DNS server 22 will check if there is a preference listed for how the response is to be sent (steps 104 and 108). If there is no preferred response, the response is sent in the same format as that of the request (steps 108 and 110). If a preferred response is specified, the response is sent according to this format (steps 108 and 112). The originating client receives the response at step 114. As discussed above, the response may be sent directly to the client or forwarded to the client from intermediate servers 28. If the response is encrypted and signed, the client decrypts the response and verifies the signature (steps 115 and 117). If the response is signed, the client verifies the signature (steps 116 and 118). If the response is encrypted, the originating client 24 uses a decryption key obtained from the target host to decrypt the response (steps 120 and 122).

As can be observed from the foregoing, the system and method of the present invention provide numerous advantages. The control mechanism of the DNS server provides access to at least some of its stored IP addresses only to clients that can authenticate themselves to the DNS server. Furthermore, responses may be sent encrypted to the client so that intermediate DNS servers are not able to read the response.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for controlling access to information from a DNS server having an access control list specifying clients approved to receive an IP address corresponding to a domain name of a target host, the method comprising:
   receiving a request from a client for an IP address of a domain name at the DNS server;
   looking up the domain name in the access control list, wherein the access control list specifies clients approved to receive an IP address corresponding to a domain name of a target host, and the access control list is accessed by the DNS server; and
   sending to the client a reply containing the IP address of the domain name if the client is authorized in the access control list to receive the IP address, and denying said request if the client is not authorized to receive the IP address.

2. The method of claim 1 wherein sending a reply to the client comprises sending an encrypted reply.

3. The method of claim 2 wherein the authorized clients have access to a decryption key.

4. The method of claim 2 wherein receiving a request comprises receiving a nonsecure request.

5. The method of claim 2 wherein receiving a request comprises receiving an encrypted request.

6. The method of claim 2 wherein receiving a request comprises receiving a signed request.

7. The method of claim 6 further comprising verifying the signature to authenticate the client sending the request.

8. The method of claim 1 wherein receiving a request comprises receiving the request from a second DNS server.

9. A method for controlling access to information from a DNS server having an access control list specifying clients approved to receive an IP address corresponding to a domain name of a target host, the method comprising:
   receiving a request from a client for an IP address of a domain name at the DNS server;
   looking up the domain name in the access control list; and
   sending to the client a reply containing the IP address of the domain name if the client is authorized in the access control list to receive the IP address, and denying said request if the client is not authorized to receive the IP address;
   wherein receiving a request comprises receiving the request from a second DNS server;
   wherein sending a reply comprises sending an encrypted reply and wherein the second DNS server is configured to forward the reply to the client and is not configured to read the encrypted reply.

10. The method of claim 1 further comprising distributing decryption keys to the clients authorized in the access control list to receive the IP address of the target host.

11. The method of claim 1 further comprising selecting a security level for the reply.

12. The method of claim 11 wherein selecting the security level comprises selecting a default security level based on the security level of the request.

13. The method of claim 1 wherein receiving a request comprises receiving a request over the Internet.

14. The method of claim 1 wherein all clients are authorized to receive the IP address of the domain name if no clients are listed in the access control list for the domain name.

15. The method of claim 1 wherein receiving a request comprises receiving a URL at the DNS server, the IP address corresponding to the URL.

16. The method of claim 2 wherein the authorized clients have access to a signature key.

17. The method of claim 1 further comprising distributing signature keys to the clients authorized in the access control list to receive the IP address of the target host.

18. A computer program product for controlling access to information from DNS server having an access control list specifying clients approved to receive an IP address corresponding to a domain name of a target host, the product comprising:
   computer code that receives a request from a client for an IP address of a domain name at the DNS server;
   computer code that looks up the domain name in the access control list, wherein the access control list specifies clients approved to receive an IP address corresponding to a domain name of a target host, and the access control list is accessed by the DNS server;

computer code that sends to the client a reply containing the IP address of the domain name if the client is authorized in the access control list to receive the IP address, and denies said request if the client is not authorized to receive the IP address; and a computer-readable storage medium for storing the codes.

19. The computer program product of claim 18 wherein the computer readable medium is selected from the group consisting of CD-ROM, floppy disk, tape, flash memory, system memory, hard drive, and data signal embodied in a carrier wave.

20. The computer program product of claim 18 further comprising code that encrypts the reply.

21. The computer program product of claim 18 further comprising code that verifies a digital signature sent from the client with the request.

22. A system for controlling access to information from a DNS server, the system having a DNS server comprising:

an access control list specifying clients approved to receive an IP address corresponding to a domain name of a target host, wherein the access control list is accessed by the DNS server;

a processor configured to receive a request from a client for an IP address of the domain name, look up the domain name in the access control list, and send the client a reply containing the IP address of the domain name if the client is authorized in the access control list to receive the IP address, and deny said request if the client is not authorized to receive the IP address; and memory for storing the access control list, domain names, and corresponding IP addresses.

23. The system of claim 22 wherein the reply is encrypted.

24. The system of claim 23 wherein the clients authorized in the access control list to receive the IP address of the domain name have access to a decryption key.

25. The system of claim 23 wherein the request is a nonsecure request.

26. The system of claim 23 wherein the request is encrypted.

27. The system of claim 22 wherein the DNS server is configured to receive recursively forwarded requests from a second DNS server and send replies to the second DNS server.

28. A system for controlling access to information from a DNS server, the system having a DNS server comprising:

an access control list specifying clients approved to receive an IP address corresponding to a domain name of a target host;

a processor configured to receive a request from a client for an IP address of the domain name, look up the domain name in the access control list, and send the client a reply containing the IP address of the domain name if the client is authorized in the access control list to receive the IP address, and deny said request if the client is not authorized to receive the IP address; and memory for storing the access control list, domain names, and corresponding IP addresses;

wherein the DNS server is configured to receive recursively forwarded requests from a second DNS server and send replies to the second DNS server;

wherein the second DNS server is configured to forward the reply to the client and is not configured to read the encrypted reply.

29. The system of claim 22 wherein the processor is configured to determine whether the reply is to be sent encrypted.

30. The system of claim 22 wherein the processor is configured to verify a digital signature contained within the request.

31. The system of claim 30 wherein the client is only authorized to receive the IP address if the signature is verified.

32. The system of claim 22 wherein a reply is sent to any client requesting the IP address of a domain name having no specified clients in the access control list.

33. The system of claim 22 wherein the domain name is a URL.

34. The system of claim 23 wherein the clients authorized in the access list to receive the IP address of the domain name have access to a signature key.

* * * * *